(12) United States Patent
Miyamoto

(10) Patent No.: US 9,932,464 B2
(45) Date of Patent: Apr. 3, 2018

(54) RUBBER COMPOSITION, LAMINATED BODY OF RUBBER COMPOSITION AND METAL, AND VULCANIZED RUBBER PRODUCT

(71) Applicant: The Yokohama Rubber Co., LTD., Minato-ku, Tokyo (JP)

(72) Inventor: Tomoaki Miyamoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/619,319

(22) Filed: Jun. 9, 2017

(65) Prior Publication Data

US 2017/0275441 A1 Sep. 28, 2017

Related U.S. Application Data

(62) Division of application No. 14/409,800, filed as application No. PCT/JP2014/063231 on May 19, 2014, now Pat. No. 9,701,097.

(51) Int. Cl.
*C08L 11/00* (2006.01)
*B32B 1/08* (2006.01)
(Continued)

(52) U.S. Cl.
CPC .............. *C08L 11/00* (2013.01); *B32B 1/02* (2013.01); *B32B 1/08* (2013.01); *B32B 7/12* (2013.01);
(Continued)

(58) Field of Classification Search
CPC ... C08K 3/06; C08K 5/31; C08K 5/40; C08K 5/405; C08K 5/44; C08L 9/00; C08L 9/06; C08L 9/08; C08L 9/10; C08L 11/00; C08L 11/02; C08L 17/00; C08L 19/003; C08L 19/006; C08L 19/02; C08J 3/24;
(Continued)

(56) References Cited

U.S. PATENT DOCUMENTS 4,668,319 A   5/1987  Piccoli
5,538,218 A * 7/1996  Patitsas ................. B29C 33/505
                                                      156/401
(Continued)

FOREIGN PATENT DOCUMENTS

JP   H06-279621   10/1994
JP   2000-336211  12/2000
(Continued)

OTHER PUBLICATIONS

International Search Report for International Application No. PCT/JP2014/063231 dated Aug. 19, 2014, 4 pages, Japan.

*Primary Examiner* — Walter B Aughenbaugh
(74) *Attorney, Agent, or Firm* — Thorpe North & Western

(57) ABSTRACT

A rubber composition of the present technology comprises: from 0.5 parts by mass to 1.5 parts by mass of sulfur, from 0.2 parts by mass to 0.6 parts by mass of a thiuram vulcanization accelerator, from 0.2 parts by mass to 0.6 parts by mass of a guanidine vulcanization accelerator, from 0.15 parts by mass to 0.8 parts by mass of a sulfenamide vulcanization accelerator, and from 0.1 parts by mass to 1.5 parts by mass of a thiourea vulcanization accelerator per 100 parts by mass of a diene polymer containing a chloroprene rubber.

3 Claims, 4 Drawing Sheets

(51) Int. Cl.
| | |
|---|---|
| B32B 15/02 | (2006.01) |
| B32B 15/00 | (2006.01) |
| B32B 1/02 | (2006.01) |
| B32B 15/04 | (2006.01) |
| B32B 27/32 | (2006.01) |
| F16L 11/08 | (2006.01) |
| B32B 15/085 | (2006.01) |
| C08L 9/00 | (2006.01) |
| C08L 17/00 | (2006.01) |
| C08L 9/10 | (2006.01) |
| C08L 9/08 | (2006.01) |
| C08L 11/02 | (2006.01) |
| C08L 19/02 | (2006.01) |
| C08J 3/24 | (2006.01) |
| C08L 19/00 | (2006.01) |
| B32B 15/06 | (2006.01) |
| C08K 3/06 | (2006.01) |
| C08K 5/31 | (2006.01) |
| C08K 5/40 | (2006.01) |
| C08K 5/405 | (2006.01) |
| C08K 5/44 | (2006.01) |
| C08L 9/06 | (2006.01) |
| F16L 11/00 | (2006.01) |
| B32B 7/12 | (2006.01) |
| B32B 15/18 | (2006.01) |
| B32B 25/14 | (2006.01) |

(52) U.S. Cl.
CPC .............. *B32B 15/00* (2013.01); *B32B 15/02* (2013.01); *B32B 15/04* (2013.01); *B32B 15/06* (2013.01); *B32B 15/085* (2013.01); *B32B 15/18* (2013.01); *B32B 25/14* (2013.01); *B32B 27/322* (2013.01); *C08J 3/24* (2013.01); *C08K 3/06* (2013.01); *C08K 5/31* (2013.01); *C08K 5/40* (2013.01); *C08K 5/405* (2013.01); *C08K 5/44* (2013.01); *C08L 9/00* (2013.01); *C08L 9/06* (2013.01); *C08L 9/08* (2013.01); *C08L 9/10* (2013.01); *C08L 11/02* (2013.01); *C08L 17/00* (2013.01); *C08L 19/003* (2013.01); *C08L 19/006* (2013.01); *C08L 19/02* (2013.01); *F16L 11/00* (2013.01); *F16L 11/08* (2013.01); *F16L 11/081* (2013.01); *F16L 11/082* (2013.01); *F16L 11/083* (2013.01); *F16L 11/085* (2013.01); *F16L 11/086* (2013.01); *B32B 2250/40* (2013.01); *B32B 2255/06* (2013.01); *B32B 2255/205* (2013.01); *B32B 2270/00* (2013.01); *B32B 2307/306* (2013.01); *B32B 2307/51* (2013.01); *B32B 2307/536* (2013.01); *B32B 2307/54* (2013.01); *B32B 2307/714* (2013.01); *B32B 2307/732* (2013.01); *B32B 2597/00* (2013.01); *C08L 2205/06* (2013.01); *C08L 2312/00* (2013.01)

(58) Field of Classification Search
CPC .... B32B 1/00; B32B 1/02; B32B 1/08; B32B 15/00; B32B 15/02; B32B 15/04; B32B 15/06; B32B 15/085; B32B 15/18; B32B 15/20; B32B 27/32; B32B 27/322
See application file for complete search history.

(56) References Cited

U.S. PATENT DOCUMENTS

| | | | |
|---|---|---|---|
| 8,227,551 | B2 * | 7/2012 | Lesser ........................ C08J 3/24 522/157 |
| 2014/0103262 | A1 | 4/2014 | Marui et al. |

FOREIGN PATENT DOCUMENTS

| | | |
|---|---|---|
| JP | 2001-279022 | 10/2001 |
| JP | 2001-342299 | 12/2001 |
| JP | 2003-026855 | 1/2003 |
| JP | 2011-001528 | 1/2011 |
| JP | 2013-139490 | 7/2013 |
| JP | 2014-080456 | 5/2014 |

* cited by examiner

RUBBER COMPOSITION, LAMINATED BODY OF RUBBER COMPOSITION AND METAL, AND VULCANIZED RUBBER PRODUCT

RELATED APPLICATIONS

This application is a divisional of U.S. patent application Ser. No. 14/409,800, filed on Dec. 19, 2014, which is the National Stage of International Patent Application No. PCT/JP2014/063231, filed on May 19, 2014.

TECHNICAL FIELD

The present technology relates to a rubber composition, a laminated body of the rubber composition and a metal, and a vulcanized rubber product, and particularly relates to a rubber composition, a laminated body of the rubber composition and a metal, and a vulcanized rubber product containing a plurality of vulcanization accelerator.

BACKGROUND

Conventionally, chloroprene rubber compositions for manufacturing hydraulic hose and high pressure hose in which a reinforcing layer having a surface plated with a metal such as brass is sandwiched by a pair of rubber layers have been proposed (e.g. see Japanese Unexamined Patent Application Publication No. 2001-279022A). Since this rubber composition contains a vulcanization accelerator such as sulfurs and guanidines, crosslinking characteristics of a rubber layer formed from the rubber composition is enhanced, and adhesion between a metal surface of the reinforcing layer and the rubber layer is enhanced.

Methods of manufacturing hose described above include a steam vulcanization method in which the rubber composition is heated and vulcanized by steam, and an oven vulcanization method in which the rubber composition is heated and vulcanized by an oven. Since the oven vulcanization method allows continuous vulcanization, productivity of hose can be enhanced.

However, when vulcanization of a rubber composition is performed by the oven vulcanization method, sufficient adhesion between the rubber layer and the reinforcing layer may not be always obtained due to vaporization of remarkable amount of water during the vulcanization. Therefore, there has been a demand for a rubber composition that has excellent heat resistance and that can provide a rubber layer having excellent adhesion toward a reinforcing layer even when vulcanized by a hot-air vulcanization method such as the oven vulcanization method.

SUMMARY

The present technology provides a rubber composition that has excellent heat resistance and that can provide a rubber layer having excellent adhesion toward a reinforcing layer even when the rubber composition is vulcanized by a hot-air vulcanization method, a laminated body of the rubber composition and a metal, and a vulcanized rubber product.

A rubber composition of the present technology comprises: from 0.5 parts by mass to 1.5 parts by mass of sulfur, from 0.2 parts by mass to 0.6 parts by mass of a thiuram vulcanization accelerator, from 0.2 parts by mass to 0.6 parts by mass of a guanidine vulcanization accelerator, from 0.15 parts by mass to 0.8 parts by mass of a sulfenamide vulcanization accelerator, and from 0.1 parts by mass to 1.5 parts by mass of a thiourea vulcanization accelerator per 100 parts by mass of a diene polymer containing a chloroprene rubber.

In the rubber composition of the present technology, a content of the chloroprene rubber in the diene polymer is preferably from 40 mass % to 100 mass %, and a content of a styrene butadiene rubber in the diene polymer is preferably from 0 mass % to 60 mass %.

A laminated body of a rubber composition and a metal of the present technology comprises: a rubber layer containing the rubber composition described in claim 1 or 2; and a reinforcing layer that is provided on the rubber layer and has a metal surface.

In the laminated body of a rubber composition and a metal of the present technology, the metal surface is preferably formed by plating with brass.

In the laminated body of a rubber composition and a metal of the present technology, the reinforcing layer preferably has a braided structure in which wires have been braided, or a spiral structure.

A vulcanized rubber product of the present technology is obtained by using the rubber composition described above.

In the vulcanized rubber product of the present technology, the rubber layer of the laminated body of a rubber composition and a metal described above is vulcanized in the presence of sulfur and adhered to the reinforcing layer.

The vulcanized rubber product of the present technology is preferably a hose.

The hose of the present technology is produced by vulcanizing in an oven vulcanization device.

According to the present technology, a rubber composition that has excellent heat resistance and that can provide a rubber layer having excellent adhesion toward a reinforcing layer even when the rubber composition is vulcanized by a hot-air vulcanization method, a laminated body of the rubber composition and a metal, and a vulcanized rubber product can be produced.

DETAILED DESCRIPTION

Figure 1:
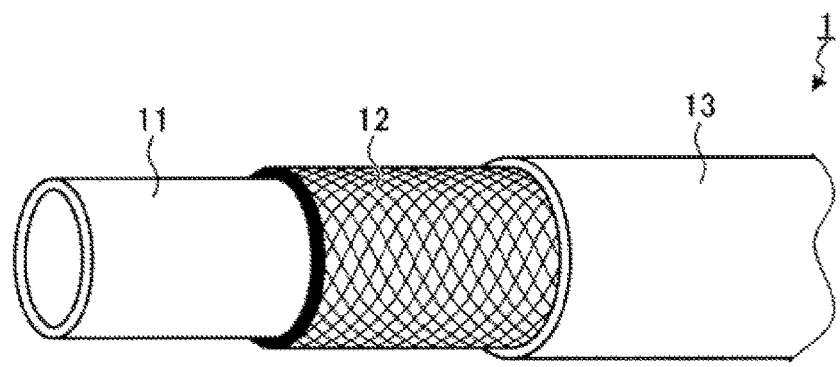
FIG. 1 is a schematic perspective view of an example of a hydraulic hose according to an embodiment of the present technology.

An embodiment of the present technology will be described below in detail with reference to the attached drawings. Note that the present technology is not limited to the embodiment described below and can be performed with suitable modifications.

A rubber composition according to the present embodiment comprises: from 0.5 parts by mass to 1.5 parts by mass of sulfur, from 0.2 parts by mass to 0.6 parts by mass of a thiuram vulcanization accelerator, from 0.2 parts by mass to 0.6 parts by mass of a guanidine vulcanization accelerator, from 0.15 parts by mass to 0.8 parts by mass of a sulfenamide vulcanization accelerator, and from 0.1 parts by mass to 1.5 parts by mass of a thiourea vulcanization accelerator per 100 parts by mass of a diene polymer containing a chloroprene rubber.

Since the rubber composition according to the present embodiment contains a predetermined amount of sulfur and four types of vulcanization accelerators including the thiuram vulcanization accelerator, guanidine vulcanization accelerator, sulfenamide vulcanization accelerator, and thiourea vulcanization accelerator relative to the amount of the diene rubber polymer, vulcanization properties are enhanced in a well-balanced manner due to the synergistic effect of vulcanization accelerators. Because of this, adhesion between a rubber layer and a reinforcing layer is enhanced even when the rubber layer is formed by the rubber composition provided on the reinforcing layer having a metal surface formed by plating with brass and then oven-vulcanized.

<Diene Polymer>

As the diene polymer, a diene polymer containing a chloroprene rubber (CR) is used. "Chloroprene rubber (CR)" refers to a homopolymer of chloroprene monomers (hereinafter referred to as chloroprene-based monomer) or a copolymer obtained by polymerizing a chloroprene monomer and a mixture of at least one type of another monomer that can be copolymerized with the chloroprene monomer (hereinafter referred to as chloroprene-based polymer).

Chloroprene rubbers are classified into a sulfur-modified type, a mercaptan-modified type, and a xanthogen-modified type depending on the types of the molecular weight modifier. As the chloroprene rubber, any of the modified-types can be used. Among these, since the mercaptan-modified type and the xanthogen-modified type lead to excellent heat resistance of the polymer itself compared to the sulfur-modified type, the mercaptan-modified type and the xanthogen-modified type are preferable for cases where higher heat resistance is required.

The sulfur-modified type chloroprene rubber is a chloroprene rubber obtained by plasticizing, with thiuram disulfide, a polymer obtained by copolymerizing sulfur and chloroprene monomers or chloroprene-based monomers, and then adjusting to have a predetermined Mooney viscosity.

The mercaptan-modified type chloroprene rubber is a chloroprene rubber obtained by using an alkylmercaptan such as n-dodecyl mercaptan, tert-dodecyl mercaptan, and octyl mercaptan as a molecular weight modifier.

The xanthogen-modified type chloroprene rubber is a chloroprene rubber obtained by using an alkyl xanthogen compound as a molecular weight modifier. The alkyl xanthogen compound is not particularly limited and can be selected appropriately depending on the purpose. Examples of the alkyl xanthogen compound include dimethylxanthogen disulfide, diethylxanthogen disulfide, diisopropylxanthogen disulfide, diisobutylxanthogen disulfide, and the like.

The used amount of the alkyl xanthogen compound is not particularly limited as long as the used amount is selected in the manner that the molecular weight (or the Mooney viscosity) of the chloroprene rubber becomes appropriate, and the used amount can be selected appropriately depending on the purpose (structure of the alkyl group or targeted molecular weight). The used amount of the alkyl xanthogen compound is preferably from 0.05 parts by mass to 5.0 parts by mass, and more preferably from 0.3 parts by mass to 1.0 parts by mass per 100 parts by mass of chloroprene monomers or chloroprene-based monomers.

As the diene polymer, another diene polymer that is sulfur vulcanizable except chloroprene rubber in a range that the effect of the present technology can be exhibited. Here, "sulfur vulcanizable" means having a property that can form a crosslinking structure via sulfur. Examples of the another diene polymer include a natural rubber (NR), isoprene rubber (IR), styrene butadiene rubber (SBR), acrylonitrile-butadiene rubber (NBR), and ethylene-propylene-diene rubber (EPDM). By using these, various physical properties that are required for a rubber composition for hose can be exhibited at a high level. One type of these diene polymers may be used alone, or two or more types of these diene polymers may be used in a combination.

In the present embodiment, a diene polymer having a content of the chloroprene rubber (CR) of 40 mass % to 100 mass %, and a content of a styrene butadiene rubber (SBR) of 0 mass % to 60 mass % is preferably used from the perspectives of heat resistance of the rubber composition and adhesion of the rubber composition to the metal surface of the reinforcing layer.

The compounded amount of the diene polymer is preferably from 20 mass % to 70 mass % relative to the total amount of the rubber composition from the perspectives of imparting good mixing processability and good appearance to the rubber.

<Vulcanizing Agent>

The rubber composition according to the present embodiment contains sulfur as the vulcanizing agent. Examples of sulfur include powdered sulfur, precipitated sulfur, highly dispersible sulfur, surface treated sulfur, and insoluble sulfur.

The content of sulfur is from 0.5 parts by mass to 1.5 parts by mass per 100 parts by mass of the diene polymer. If the content of sulfur is from 0.5 parts by mass to 1.5 parts by mass, a rubber composition having excellent heat resistance as well as excellent adhesion between a rubber layer using the rubber composition and the reinforcing layer can be obtained. The content of sulfur is preferably 0.55 parts by mass or greater, more preferably 0.6 parts by mass or greater, further preferably 0.7 parts by mass or greater, and yet further preferably 0.8 parts by mass or greater, and preferably 1.3 parts by mass or less, more preferably 1.2 parts by mass or less, further preferably 1.1 parts by mass or less, and yet further preferably 1.0 parts by mass or less, per 100 parts by mass of the diene polymer. Taking these into consideration, the content of sulfur is preferably from 0.55 parts by mass to 1.3 parts by mass, more preferably from 0.6 parts by mass to 1.2 parts by mass, further preferably from 0.7 parts by mass to 1.1 parts by mass, and yet further preferably from 0.8 parts by mass to 1.0 parts by mass, per 100 parts by mass of the diene polymer.

The rubber composition according to the present embodiment may contain another vulcanizing agent other than sulfur in a range that the effect of the present technology can be exhibited. Examples of the vulcanizing agent other than sulfur include sulfur-based, organic peroxide-based, metal oxide-based, phenolic resin, quinone dioxime, and the like. One type of these vulcanizing agents other than sulfur may be used alone, or two or more types of these vulcanizing agents other than sulfur may be used in a combination. Examples of the sulfur-based vulcanizing agent include, but except the thiuram vulcanization accelerator used in the rubber composition according to the present technology, organic sulfur-containing compounds such as dimorpholine disulfide and alkylphenol disulfide.

Examples of the organic peroxide-based vulcanizing agent include dicumyl peroxide, benzoyl peroxide, t-butyl hydroperoxide, 2,4-dichlorobenzoyl peroxide, 2,5-dimethyl-2,5-di(t-butylperoxy)hexane, and 2,5-dimethylhexane-2,5-di(peroxyl benzoate).

Examples of the other vulcanizing agent include zinc oxide, magnesium oxide, resins such as phenol resin, p-quinone dioxime, p-dibenzoylquinone dioxime, poly-p-dinitrosobenzene, methylenedianiline, and the like.

<Vulcanization Accelerator>

The rubber composition according to the present embodiment contains a thiuram vulcanization accelerator, guanidine vulcanization accelerator, sulfenamide vulcanization accelerator, and thiourea vulcanization accelerator. In the rubber composition according to the present embodiment, by using sulfur as the vulcanizing agent described above, and four types of vulcanization accelerators including the thiuram vulcanization accelerator, guanidine vulcanization accelerator, sulfenamide vulcanization accelerator, and thiourea vulcanization accelerator, heat resistance of the rubber composition and adhesion between a rubber layer using the rubber composition and a metal surface of a reinforcing layer can be enhanced.

The content of the thiuram vulcanization accelerator is from 0.2 parts by mass to 0.6 parts by mass per 100 parts by mass of the diene polymer. If the content of the thiuram vulcanization accelerator is from 0.2 parts by mass to 0.6 parts by mass, a rubber composition having excellent heat resistance as well as excellent vulcanization characteristics and excellent adhesion between a rubber layer using the rubber composition and the reinforcing layer can be obtained. Examples of the thiuram vulcanization accelerator include dipentamethylenethiuram tetrasulfide, tetramethylthiuram monosulfide (TS), tetramethylthiuram disulfide (TT), tetraethylthiuram disulfide (TETD), tetrabutylthiuram disulfide (TBTD), tetrabenzylthiuram disulfide, tetrakis(2-ethylhexyl)thiuram disulfide, and the like.

The content of the thiuram vulcanization accelerator is preferably 0.25 parts by mass or greater, more preferably 0.3 parts by mass or greater, further preferably 0.35 parts by mass or greater, and preferably 0.55 parts by mass or less, more preferably 0.50 parts by mass or less, further preferably 0.45 parts by mass or less, per 100 parts by mass of the diene polymer. The content of the thiuram vulcanization accelerator is preferably from 0.25 parts by mass to 0.55 parts by mass, more preferably from 0.3 parts by mass to 0.5 parts by mass, and further preferably from 0.35 parts by mass to 0.45 parts by mass, per 100 parts by mass of the diene polymer.

The content of the guanidine vulcanization accelerator is from 0.2 parts by mass to 0.6 parts by mass per 100 parts by mass of the diene polymer. If the content of the guanidine vulcanization accelerator is from 0.2 parts by mass to 0.6 parts by mass, a rubber composition having excellent heat resistance as well as excellent vulcanization characteristics and excellent adhesion between a rubber layer using the rubber composition and the reinforcing layer can be obtained. Examples of the guanidine vulcanization accelerator include N,N'-diphenylguanidine, N,N'-di-ortho-tolylguanidine, and the like.

The content of the guanidine vulcanization accelerator is preferably 0.25 parts by mass or greater, more preferably 0.3 parts by mass or greater, further preferably 0.35 parts by mass or greater, and preferably 0.55 parts by mass or less, more preferably 0.50 parts by mass or less, further preferably 0.45 parts by mass or less, per 100 parts by mass of the diene polymer from the perspectives of obtaining a rubber composition having excellent heat resistance as well as excellent adhesion between a rubber layer using the rubber composition and the reinforcing layer. The content of the guanidine vulcanization accelerator is preferably from 0.25 parts by mass to 0.55 parts by mass, more preferably from 0.3 parts by mass to 0.5 parts by mass, and further preferably from 0.35 parts by mass to 0.45 parts by mass, per 100 parts by mass of the diene polymer.

The content of the sulfenamide vulcanization accelerator is from 0.15 parts by mass to 0.8 parts by mass per 100 parts by mass of the diene polymer. If the content of the sulfenamide vulcanization accelerator is from 0.15 parts by mass to 0.8 parts by mass, a rubber composition having excellent heat resistance as well as excellent vulcanization characteristics and excellent adhesion between a rubber layer using the rubber composition and the reinforcing layer can be obtained. Examples of the sulfenamide vulcanization accelerator include N-cyclohexyl-2-benzothiazolyl sulfenamide (CZ), N-t-butyl-2-benzothiazolyl sulfenamide (NS), N-oxydiethylene-2-benzothiazolyl sulfenamide, N,N-diisopropyl-2-benzothiazolyl sulfenamide, N,N-dicyclohexyl-2-benzothiazolyl sulfenamide, and the like.

The content of the sulfenamide vulcanization accelerator is preferably 0.2 parts by mass or greater, more preferably 0.25 parts by mass or greater, further preferably 0.3 parts by mass or greater, and preferably 0.75 parts by mass or less, more preferably 0.7 parts by mass or less, further preferably 0.65 parts by mass or less, per 100 parts by mass of the diene polymer from the perspectives of obtaining a rubber composition having excellent heat resistance as well as excellent adhesion between a rubber layer using the rubber composition and the reinforcing layer. The content of the sulfenamide vulcanization accelerator is preferably from 0.2 parts by mass to 0.75 parts by mass, more preferably from 0.25 parts by mass to 0.7 parts by mass, and further preferably from 0.3 parts by mass to 0.65 parts by mass, per 100 parts by mass of the diene polymer.

The content of the thiourea vulcanization accelerator is from 0.1 parts by mass to 1.5 parts by mass per 100 parts by mass of the diene polymer. If the content of the thiourea vulcanization accelerator is from 0.1 parts by mass to 1.5 parts by mass, a rubber composition having excellent heat resistance as well as excellent adhesion between a rubber layer using the rubber composition and the reinforcing layer can be obtained.

The content of the thiourea vulcanization accelerator is preferably 0.2 parts by mass or greater, more preferably 0.3 parts by mass or greater, further preferably 0.4 parts by mass or greater, and preferably 1.3 parts by mass or less, more preferably 1.2 parts by mass or less, further preferably 1.1 parts by mass or less, per 100 parts by mass of the diene polymer from the perspectives of obtaining a rubber composition having excellent heat resistance as well as excellent adhesion between a rubber layer using the rubber composition and the reinforcing layer. The content of the thiourea vulcanization accelerator is preferably from 0.2 parts by mass to 1.3 parts by mass, more preferably from 0.3 parts by mass to 1.2 parts by mass, and further preferably from 0.4 parts by mass to 1.1 parts by mass, per 100 parts by mass of the diene polymer. Examples of the thiourea vulcanization accelerator include ethylene thiourea(2-mercaptoimidazoline), N,N'-diethyl thiourea, trimethyl thiourea, N,N'-dibutyl thiourea, and the like.

The rubber composition according to the present embodiment may contain another vulcanizing agent other than the vulcanizing agent described above in a range that the effect of the present technology can be exhibited. Examples of another vulcanization accelerator include aldehyde-ammonia vulcanization accelerator, aldehyde-amine vulcanization accelerator, thiazole vulcanization accelerator, dithiocarbamate vulcanization accelerator, xanthogenate vulcanization accelerator, and the like. One type of these may be used alone, or two or more types of these may be used in a combination.

[Other Additives]

The rubber composition may contain other additives, if necessary, in a range that the effect of the present technology can be exhibited. Examples of the other additive include fillers, plasticizers, softeners, antiaging agents, organic activators, antioxidants, antistatic agents, flame retardants, crosslinking-accelerating auxiliaries, vulcanization retarders, antiozonants, aroma oil, adhesive auxiliaries, and the like.

Examples of the fillers include carbon black, silica (white carbon black), clay, talc, iron oxide, zinc oxide (ZnO), titanium oxide, barium oxide, magnesium oxide, calcium carbonate, magnesium carbonate, zinc carbonate, barium sulfate, mica, diatomaceous earth, and the like. One type of these fillers may be used alone, or two or more types of these fillers may be used in a combination. As the carbon black, any carbon black can be suitably selected and used depending on the purpose. ISAF grade and FEF grade carbon blacks are preferable. Examples of the silica include crystallized silica, amorphous silica (e.g. high temperature treated silica), fumed silica, calcined silica, precipitated silica, pulverized silica, molten silica, and the like. In particular, silica is known to generate a carbon gel (bound rubber) in the similar manner as in carbon black and can be suitably used if necessary. Examples of the clay include hard clay, pyropyllite clay, kaolin clay, calcined clay, and the like.

Examples of the plasticizer include dioctyl phthalate (DOP), dibutyl phthalate (DBP), dioctyl adipate (DOA), isodecyl succinate, di(ethylene glycol) dibenzoate, pentaerythritol ester, butyl oleate, methyl acetyl ricinoleate, tricresyl phosphate, trioctyl phosphate, trimellitic acid ester, propylene glycol adipate polyester, butylene glycol adipate polyester, naphthenic oil, and the like. One type of these plasticizers may be used alone, or two or more types of these plasticizers may be used in a combination.

Specific examples of the softener include aromatic oil, naphthenic oil, paraffinic oil, petroleum resin, vegetable oil, liquid rubber, and the like. One type of these softeners may be used alone, or two or more types of these softeners may be used in a combination.

Examples of the antiaging agent include N-(1,3-dimethylbutyl)-N'-phenyl-p-phenylenediamine (6PPD), N,N'-dinaphthyl-p-phenylenediamine (DNPD), N-isopropyl-N'-phenyl-p-phenylenediamine (IPPD), styrenated phenol (SP), 2,2,4-trimethyl-1,2-dihydroquinoline polymer (RD), and the like. One type of these antiaging agents may be used alone, or two or more types of these antiaging agents may be used in a combination.

Examples of the organic activator include stearic acid, oleic acid, lauric acid, zinc stearate, and the like. One type of these organic activators may be used alone, or two or more types of these organic activators may be used in a combination.

Examples of the antioxidant include butylhydroxytoluene (BHT) and butylhydroxyanisole (BHA).

Examples of the antistatic agent include quaternary ammonium salts; and hydrophilic compounds such as polyglycols and ethylene oxide derivatives.

Examples of the flame retardant include chloroalkyl phosphates, dimethyl-methyl phosphonates, bromine-phosphorus compounds, ammonium polyphosphates, neopentyl bromide polyethers, brominated polyethers, and the like. Examples of non-halogen-based flame retardant include aluminum hydroxide, magnesium hydroxide, tricresyl phosphate, and diphenyl cresyl phosphate.

A conventional auxiliary for rubber can be used together as a crosslinking-accelerating auxiliary. As the auxiliary for rubber, zinc oxide, magnesium oxide; stearic acid, oleic acid, and Zn salts of these can be used.

Examples of the vulcanization retarder include organic acids such as phthalic anhydride, benzoic acid, salicylic acid, and acetylsalicylic acid; nitroso compounds such as polymers of N-nitroso-diphenylamine, N-nitroso-phenyl-β-naphthylamine, and N-nitroso-trimethyl-dihydroquinoline; halides such as trichloromelanine; 2-mercaptobenzimidazole, N-(cyclohexylthio)phthalimide (PVI), and the like. One type of these vulcanization retarders may be used alone, or two or more types of these vulcanization retarders may be used in a combination.

Examples of the adhesive auxiliary include triazine thiol compounds (e.g. 2,4,6-trimercapto-1,3,5-triazine and 6-butylamino-2,4-dimercapto-1,3,5-triazine), resorcin, cresol, resorcin-formalin latex, monomethylol melamine, monomethylol urea, ethylene maleimide, cobalt naphthenate, cobalt stearate, cobalt versatate, cobalt dodecanoate, and the like. One type of these adhesive auxiliaries may be used alone, or two or more types of these adhesive auxiliaries may be used in a combination.

<Method of Producing Rubber Composition>

The rubber composition according to the present embodiment can be produced by a conventionally known production method. An example of the method of producing the rubber composition according to the present embodiment is a production method comprising the steps of: compounding the diene polymer described above, and as necessary, another diene polymer, a polymer other than the diene polymer, and various additives described above; and kneading the mixture using an internal mixer such as a Banbury mixer or a kneader, a roll kneader such as a roll, an extruder, a twin screw extruder, or the like.

[Laminated Body of the Rubber Composition and a Metal]

The laminated body of the rubber composition and a metal according to the present embodiment is a laminated body of the rubber composition described above and a reinforcing layer of a wire having a metal plated surface. Examples of this laminated body include a high pressure hose, hydraulic hose, and the like. FIG. 1 is a partial cutaway perspective view of an example of a hydraulic hose according to the present embodiment. As illustrated in FIG. 1, the hydraulic hose 1 is formed cylindrically and comprises an inner rubber layer 11 for passing fluid therein, a reinforcing layer 12 provided on the outer side of the inner rubber layer 11, and an outer rubber layer 13 provided on the outer side of the reinforcing layer 12. The reinforcing layer 12 is arranged in the manner that the inner rubber layer 11 and the outer rubber layer 13 sandwich the reinforcing layer 12. The inner rubber layer 11, the reinforcing layer 12, and the outer rubber layer 13 are adhered and fixed due to the vulcanization of the inner rubber layer 11 and the outer rubber layer 13.

<Rubber Layer>

As described above, the inner rubber layer 11 and/or the outer rubber layer 13 are rubber layers in which the rubber composition according to the present embodiment is used. From the perspective of weatherability of the hose, it is preferable to form at least the outer rubber layer 13 using the rubber composition according to the present embodiment. The inner rubber layer 11 is preferably formed by using a rubber composition containing an acrylonitrile butadiene rubber (NBR) having excellent oil resistance as a main component.

The thickness of the inner rubber layer 11 is, for example, preferably from 0.2 mm to 4.0 mm, and more preferably from 0.5 mm to 2.0 mm. Similarly, the thickness of the outer rubber layer 13 is, for example, preferably from 0.2 mm to 4.0 mm, and more preferably from 0.5 mm to 2.0 mm.

<Reinforcing Layer>

The reinforcing layer 12 is a wire braid in which steel wires having a surface plated with brass are braided. From the perspective of maintaining the strength of the hydraulic hose 1, the reinforcing layer 12 is a layer provided in between the inner rubber layer 11 and the outer rubber layer 13. Note that, in the example illustrated in FIG. 1, the reinforcing layer 12 is one layer; however, a plurality of the reinforcing layers 12 in which middle rubber layer(s) is(are) provided in between the layers may be provided. The reinforcing layer 12 may be, other than a wire braid, spiral wires formed by winding steel wires spirally around the inner rubber layer 11. Materials, and a braiding method, weaving method, or winding method that forms the reinforcing layer 12 can be suitably selected depending on the application, for example depending on pressure resistance. In the hydraulic hose and the like, the reinforcing layer 12 is preferably formed by a wire braid.

Examples of the wire materials include piano wires (carbon steel), hard steel wires, and stainless steel wires. From the perspectives of processability and strength, piano wires (carbon-steel) and hard steel wires are particularly preferable as the wire materials.

In order to enhance the adhesion toward the rubber layer, the surface of the reinforcing layer 12 is plated with a metal. This metal plating is a brass coating applied on piano wires and hard steel wires. The brass coating is formed by plating a steel wire with copper, plating with zinc over the copper, and then subjecting the wire to thermal diffusion processing.

<Vulcanized Rubber Product>

In the laminated body of the rubber composition and a metal of the rubber composition and the reinforcing layer 12 described above, molecules in the rubber forming the inner rubber layer 11 and the outer rubber layer 13 are crosslinked each other by sulfur when crosslinked, i.e. vulcanized, in the presence of sulfur. This crosslinking imparts elasticity and tensile strength to the inner rubber layer 11 and the outer rubber layer 13, and adheres the inner rubber layer 11 and the outer rubber layer 13 to the reinforcing layer 12 due to the bond formed between the sulfur and the metal (copper, zinc) constituting the brass coating, at the interface between the rubber layers and the reinforcing layer 12.

Sulfur is preferably blended together with other materials when a compound of the rubber composition is formed. Note that the time at which sulfur is blended is not limited to the time when the compound is prepared as long as molecules forming the diene polymer are crosslinked each other by the sulfur, and as long as the inner rubber layer 11 and the outer rubber layer 13 are adhered to the reinforcing layer 12 due to the bond formed between the sulfur and the metal (copper, zinc) at the interface between the inner rubber layer 11 and the outer rubber layer 13 and the reinforcing layer 12, and the like.

An example of the method of vulcanization is a method in which the rubber composition is heat treated at a predetermined temperature for predetermined time period in the presence of sulfur. The vulcanization temperature is preferably from 130° C. to 180° C. The vulcanization time is preferably from 30 minutes to 240 minutes. By a combination of the temperature and the time in these ranges, desired physical properties as a vulcanized rubber product such as elasticity, tensile strength, appearance, adhesion at the interface between the rubber and the metal, and rubber adhesion at the interface between the rubber and the metal can be imparted.

The vulcanized rubber product in the present embodiment can be suitably used as hydraulic hose and the like. Examples of the method of producing hydraulic hose and the like include a steam vulcanization method in which the laminated body of the rubber composition and a metal is placed and sealed in a pressure vessel and crosslinked in a steam boiler, and an oven vulcanization method in which the laminated body of the rubber composition and a metal is covered with a nylon cloth or the like and vulcanized in a hot-air drying oven. In general, the steam vulcanization method is a batch type treatment, and the oven vulcanization method is a continuous type treatment. The method of producing hydraulic hose is preferably an oven vulcanization method which is a continuous type treatment.

<Method of Producing Vulcanized Rubber Product>

A method of producing vulcanized rubber product according to the present embodiment will be described below. Here, an example of the case where a hydraulic hose is produced as the vulcanized rubber product will be described.

Figure 2:
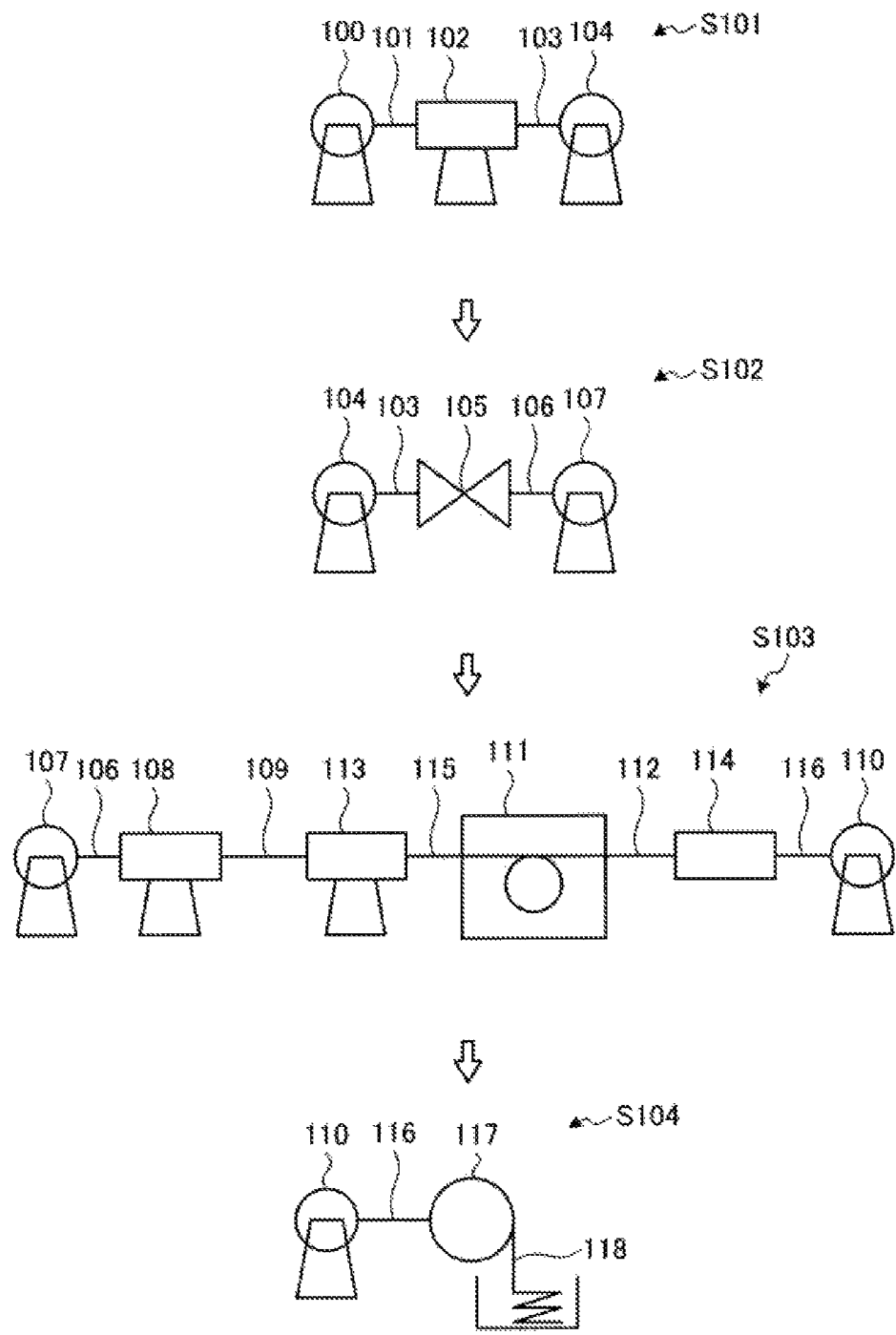
FIG. 2 is an explanatory diagram of production steps of a hydraulic hose using a rubber composition according to an embodiment of the present technology.
Figure 3:
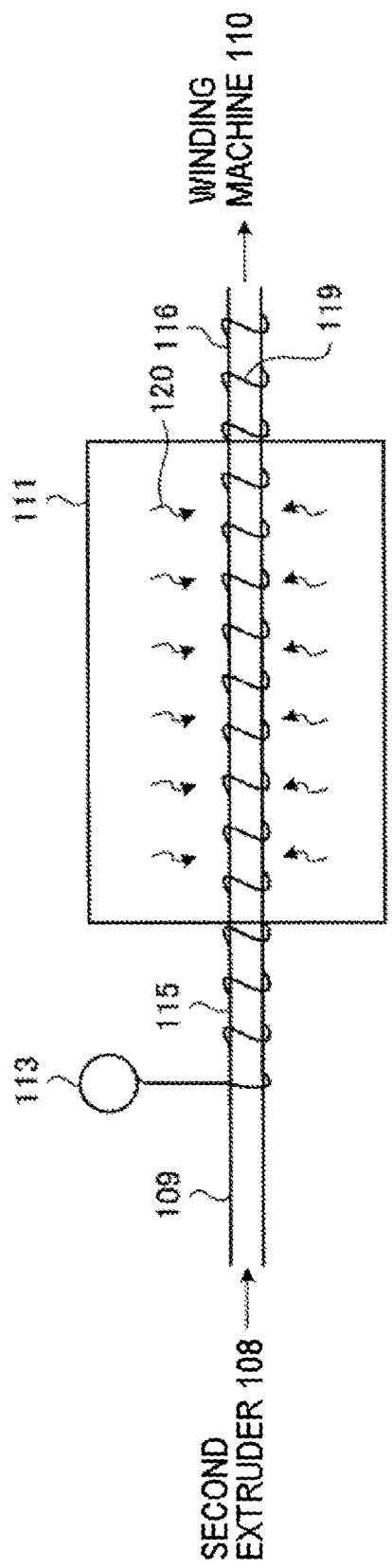
FIG. 3 is an explanatory diagram of vulcanization steps of the hydraulic hose using the rubber composition according to the embodiment of the present technology.

The method of producing a hydraulic hose according to the present embodiment will be described with reference to FIGS. 2 and 3. FIG. 2 is an explanatory diagram of production steps of a hydraulic hose using a rubber composition according to an embodiment of the present technology. FIG. 3 is an explanatory diagram of vulcanization steps of the hydraulic hose using the rubber composition according to the embodiment of the present technology.

<Steps of Producing Hose>

As illustrated in FIG. 2, the rubber hose is obtained by an extrusion step of a rubber material that forms the inner rubber layer 11 (step S101), a braiding step of the reinforcing layer 12 (step S102), an extrusion-vulcanization step of the outer rubber layer 13 (step S103), and a removing step of mandrel 101 (step S104). The produced rubber hose is subjected to a water pressure test and a winding test step, and then packaged and shipped.

In the step S101, the outer circumferential surface of a mandrel 101 that is sent out from an unwinding machine 100 is covered by an unvulcanized inner rubber layer 11 via a first extruder 102. A hose 103 which is covered by the inner rubber layer 11 is wound by a winding-unwinding machine 104.

Next, in the step S102, a reinforcing layer 12 is braided by a braiding machine 105 in the manner that the inner rubber layer 11 constituting the hose 103 sent out from the winding-unwinding machine 104 is covered, to form a hose 106, and then the hose 106 is wound by the winding-unwinding machine 107. A metal wire is used as the code of this reinforcing layer 12. As the metal wire, a steel wire plated with brass is used in order to impart excellent adhesion toward rubber. Note that the reinforcing layer 12 may be formed by spirally winding the metal wire around the inner rubber layer 11 that is formed around the mandrel 101.

Next, in the step S103, a hose body 109 is formed by covering the reinforcing layer 12 of the hose 106 sent out from the winding-unwinding machine 107 with an unvulcanized outer rubber layer 13 using a second extruder 108, and the formed hose body 109 is wound by a winding machine 110. In the present embodiment, a vulcanized hose 112 obtained by a vulcanization step performed by a vulcanization device 111 is wound by the winding machine 110 after the hose body 109 is sent out from the second extruder 108 but before wound by the winding machine 110; however, the vulcanization step can be performed after the hose body 109 is wound by the winding machine 110. Furthermore, before and after the vulcanization device 111, a wrapping device 113 and an unwrapping device 114 are provided in order to wrap or unwrap a protective cloth such as a nylon cloth around the hose body 109. Note that, in FIG. 2, after the vulcanization, the unvulcanized hose 115 on which a nylon cloth is wrapped by the wrapping device 113 becomes a hose 116 that is in a state before unwrapping the nylon cloth. The vulcanization step will be described below.

Next, in the step S104, a hydraulic hose 118 is completed by removing the mandrel 101, using a mandrel removing device 117, from the hose 116 that is sent out from the winding machine 110 and unwrapped after the vulcanization.

<Vulcanization Step>

As illustrated in FIG. 3, by the wrapping device 113, a nylon cloth 119 is wrapped around the hose body 109 sent out from the second extruder 108. The hose body 109 covered with the nylon cloth 119 is then transferred into the vulcanization device 111. The vulcanization device 111 is a continuous vulcanization device with hot-air circulation that allows the vulcanization to proceed by hot wind 120. The vulcanization method is an oven vulcanization method.

Figure 4:
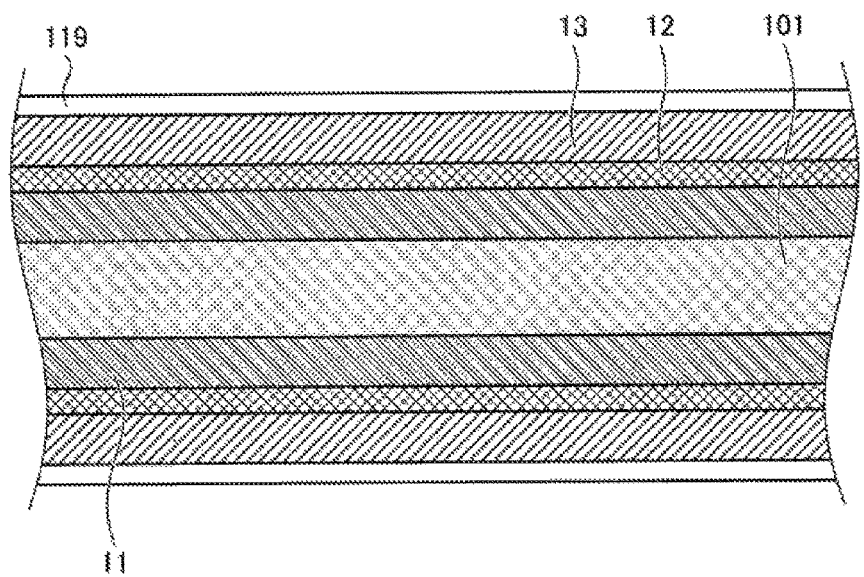
FIG. 4 is a partially cross-sectional view illustrating an example of a layer structure around a mandrel inserted into a vulcanization device of production steps of a hydraulic hose using a rubber composition according to an embodiment of the present technology.

FIG. 4 is a partially cross-sectional view explaining an example of a layer structure around a mandrel 101 inserted into a vulcanization device. As illustrated in FIG. 4, the inner rubber layer 11 is formed around the mandrel 101, the reinforcing layer 12 is further formed therearound, and the outer rubber layer 13 is further formed therearound. The nylon cloth 119 is wrapped around the outer rubber layer 13, and the outer rubber layer 13 is heated in this condition to proceed the vulcanization step.

As described above, the vulcanization temperature is preferably from 130° C. to 180° C., and the vulcanization time (that is, the vulcanization time in the vulcanization device 111) is preferably from 30 minutes to 240 minutes. Using this temperature range and the vulcanization time, a hydraulic hose having excellent adhesion between the inner rubber layer 11 and the reinforcing layer 12 and between the outer rubber layer 13 and the reinforcing layer 12 is obtained. Here, a hydraulic hose having excellent adhesion between an inner rubber layer 11 and/or an outer rubber layer 13 and a metal reinforcing layer 12 can be produced by forming the inner rubber layer 11 and/or the outer rubber layer 13 using the rubber composition according to the embodiment described above.

Note that, according to the rubber composition, since a suitable water content can be stably maintained in the composition until immediately before the vulcanization, adhesion failure and decrease in adhesion due to insufficient water content can be suppressed even when an oven vulcanization method that causes great amount of water evaporation is used. The rubber composition according to the embodiment can be, needless to say, suitably used in a production of rubber products using conventionally known another vulcanization method. Examples of another vulcanization method include press vulcanization, steam vulcanization, hot water vulcanization, and the like.

Furthermore, in the embodiment described above, production steps of continuous treatment are exemplified; however, the vulcanized rubber products can be also produced by a method in which the rubber layer and the reinforcing layer are produced in separate steps and then adhered.

The hydraulic hose produced by the production method according to the present embodiment can be used in various applications. The hydraulic hose can be suitably used as, for example, air conditioner hose for vehicles, power steering hose, hydraulic hose for hydraulic systems of construction vehicles, and the like.

Furthermore, in the present embodiment, a hydraulic hose as a laminated body of the rubber composition and a metal and as a vulcanized rubber product has been explained; however, the present technology is not limited to this, and for example, the present technology can also be used in other rubber laminated bodies such as a conveyer belt.

As described above, according to the method of producing a laminated body of the rubber composition and a metal, vulcanized rubber product, and vulcanized rubber product, vulcanized rubber products having excellent adhesion between a rubber layer and a reinforcing layer can be provided even when a continuous production method with an oven vulcanization method is used. In particular, a composition that can form a rubber product having excellent adhesion toward a reinforcing layer can be provided even in the case where the composition is stored in a dried state for a long period of time. This vulcanized rubber product can be suitably used in hydraulic hose, high pressure hose, and the like.

EXAMPLES

The present technology will be described in further detail with reference to the examples performed in order to clearly show the effect of the present technology. Note that the present technology is not limited by the working examples and comparative examples described below.

<1. Production of Rubber Composition>

Working Example 1

In 100 parts by mass of a diene polymer containing 50 mass % of a chloroprene rubber (trade name: Denka Chloroprene S-41, manufactured by Denki Kagaku Kogyo K. K; mercaptan-modified chloroprene rubber; Mooney viscosity (ML1+4, 125° C.): 47) and 50 mass % of styrene butadiene rubber (trade name: Nipol 1502, manufactured by Zeon Corporation; emulsion polymerization SBR; bonding styrene content: 23.5 mass %; Mooney viscosity (ML1+4, 100° C.): 52), 0.8 parts by mass of sulfur (manufactured by Hosoi Chemical Industry Co., Ltd.), 0.5 parts by mass of a thiuram vulcanization accelerator (tetramethylthiuram monosulfide; trade name: Sanceler TS-G, manufactured by Sanshin Chemical Industry Co., Ltd.), 0.5 parts by mass of a guanidine vulcanization accelerator (diphenylguanidine; trade name: Soxinol D-G, manufactured by Sumitomo Chemical Co., Ltd.), 0.5 parts by mass of a sulfenamide vulcanization accelerator (N-t-butylbenzothiazole-2-sulfenamide; trade name: NOCCELER NS-P, manufactured by Ouchi Shinko Chemical Industrial Co., Ltd.), 0.75 parts by mass of a thiourea vulcanization accelerator (2-mercaptoimidazoline; trade name: Sanmix 22-80E, manufactured by Sanshin Chemical Industry Co., Ltd.), 75 parts by mass of FEF grade carbon black (trade name: HTC#100, manufactured by NSCC Carbon Co., Ltd.), 5 parts by mass of type III zinc oxide (manufactured by Seido Chemical Industry Co., Ltd.), 2 parts by mass of magnesium oxide (trade name: Kyowa Mag 150, manufactured by Kyowa Chemical Industry Co., Ltd.), 2 parts by mass of stearic acid (manufactured by NOF Corporation), 2 parts by mass of an antiozonant (trade name: Ozonone 6C, manufactured by Seiko Chemical Co., Ltd.), and 25 parts by mass of an aroma oil (trade name: A-OMIX, manufactured by Sankyo Yuka Kogyo K. K.) were compounded and kneaded using a Banbury mixer to produce a rubber composition. The adhesion and heat resistance of the produced rubber composition was evaluated. Compounded amount of each of the components are shown in Table 1 below and evaluation results are shown in Table 3 below.

Working Example 2

A rubber composition was produced in the same manner as in Working Example 1 except for changing the compounded amount of sulfur to 0.5 parts by mass, and the rubber composition was evaluated. Compounded amount of each of the components are shown in Table 1 below and evaluation results are shown in Table 3 below.

Working Example 3

A rubber composition was produced in the same manner as in Working Example 1 except for changing the compounded amount of sulfur to 1.5 parts by mass, and the rubber composition was evaluated. Compounded amount of each of the components are shown in Table 1 below and evaluation results are shown in Table 3 below.

Working Example 4

A rubber composition was produced in the same manner as in Working Example 1 except for changing the compounded amount of the thiuram vulcanization accelerator to 0.2 parts by mass, and the rubber composition was evaluated. Compounded amount of each of the components are shown in Table 1 below and evaluation results are shown in Table 3 below.

Working Example 5

A rubber composition was produced in the same manner as in Working Example 1 except for changing the compounded amount of the thiuram vulcanization accelerator to 0.6 parts by mass, and the rubber composition was evaluated. Compounded amount of each of the components are shown in Table 1 below and evaluation results are shown in Table 3 below.

Working Example 6

A rubber composition was produced in the same manner as in Working Example 1 except for changing the compounded amount of the sulfenamide vulcanization accelerator to 0.8 parts by mass and the compounded amount of the thiourea vulcanization accelerator to 0.6 parts by mass, and the rubber composition was evaluated. Compounded amount of each of the components are shown in Table 1 below and evaluation results are shown in Table 3 below.

Comparative Example 1

A rubber composition was produced in the same manner as in Working Example 1 except for changing each of the compounded amounts of the thiuram vulcanization accelerator and the guanidine vulcanization accelerator to 0.8 parts by mass and compounding no sulfenamide vulcanization accelerator and no thiourea vulcanization accelerator, and the rubber composition was evaluated. Compounded amount of each of the components are shown in Table 2 below and evaluation results are shown in Table 4 below.

Comparative Example 2

A rubber composition was produced in the same manner as in Working Example 1 except for changing each of the compounded amounts of the thiuram vulcanization accelerator and the guanidine vulcanization accelerator to 0.4 parts by mass and compounding no sulfenamide vulcanization accelerator and no thiourea vulcanization accelerator, and the rubber composition was evaluated. Compounded amount of each of the components are shown in Table 2 below and evaluation results are shown in Table 4 below.

Comparative Example 3

A rubber composition was produced in the same manner as in Working Example 1 except for changing the compounded amount of the thiuram vulcanization accelerator to 0.4 parts by mass and compounding no guanidine vulcanization accelerator and no thiourea vulcanization accelerator, and the rubber composition was evaluated. Compounded amount of each of the components are shown in Table 2 below and evaluation results are shown in Table 4 below.

Comparative Example 4

A rubber composition was produced in the same manner as in Working Example 1 except for compounding no thiourea vulcanization accelerator, and the rubber composition was evaluated. Compounded amount of each of the components are shown in Table 2 below and evaluation results are shown in Table 4 below.

Comparative Example 5

A rubber composition was produced in the same manner as in Working Example 1 except for compounding no sulfenamide vulcanization accelerator, and the rubber composition was evaluated. Compounded amount of each of the components are shown in Table 2 below and evaluation results are shown in Table 4 below.

Comparative Example 6

A rubber composition was produced in the same manner as in Working Example 1 except for changing the compounded amount of sulfur to 1.6 parts by mass, and the rubber composition was evaluated. Compounded amount of each of the components are shown in Table 2 below and evaluation results are shown in Table 4 below.

Comparative Example 7

A rubber composition was produced in the same manner as in Working Example 1 except for changing the compounded amount of the thiuram vulcanization accelerator to 0.1 parts by mass, and the rubber composition was evaluated. Compounded amount of each of the components are shown in Table 2 below and evaluation results are shown in Table 4 below.

Comparative Example 8

A rubber composition was produced in the same manner as in Working Example 1 except for changing the compounded amount of the thiuram vulcanization accelerator to 0.8 parts by mass, and the rubber composition was evaluated. Compounded amount of each of the components are shown in Table 2 below and evaluation results are shown in Table 4 below.

Comparative Example 9

A rubber composition was produced in the same manner as in Working Example 1 except for changing the compounded amount of the thiuram vulcanization accelerator to 0.6 parts by mass, the compounded amount of the guanidine vulcanization accelerator to 0.1 parts by mass, and the compounded amount of the thiourea vulcanization accelerator to 0.6 parts by mass, and the rubber composition was evaluated. Compounded amount of each of the components are shown in Table 2 below and evaluation results are shown in Table 4 below.

Comparative Example 10

A rubber composition was produced in the same manner as in Comparative Example 9 except for changing the compounded amount of the guanidine vulcanization accelerator to 0.75 parts by mass, and the rubber composition was evaluated. Compounded amount of each of the components are shown in Table 2 below and evaluation results are shown in Table 4 below.

Comparative Example 11

A rubber composition was produced in the same manner as in Working Example 1 except for changing the compounded amount of sulfur to 0.6 parts by mass, the compounded amount of the sulfenamide vulcanization accelerator to 0.1 parts by mass, and the compounded amount of the thiourea vulcanization accelerator to 0.6 parts by mass, and the rubber composition was evaluated. Compounded amount of each of the components are shown in Table 2 below and evaluation results are shown in Table 4 below.

Comparative Example 12

A rubber composition was produced in the same manner as in Comparative Example 11 except for changing the compounded amount of the sulfenamide vulcanization accelerator to 1.0 parts by mass, and the rubber composition was evaluated. Compounded amount of each of the components are shown in Table 2 below and evaluation results are shown in Table 4 below.

Comparative Example 13

A rubber composition was produced in the same manner as in Working Example 1 except for changing the compounded amount of the thiourea vulcanization accelerator to 1.6 parts by mass, and the rubber composition was evaluated. Compounded amount of each of the components are shown in Table 2 below and evaluation results are shown in Table 4 below.

TABLE 1

|  | Working examples | | | | | |
|---|---|---|---|---|---|---|
|  | 1 | 2 | 3 | 4 | 5 | 6 |
| CR | 50 | 50 | 50 | 50 | 50 | 50 |
| SBR | 50 | 50 | 50 | 50 | 50 | 50 |
| Sulfur | 0.8 | 0.5 | 1.5 | 0.8 | 0.8 | 0.6 |
| Vulcanization accelerator A | 0.5 | 0.5 | 0.5 | 0.2 | 0.6 | 0.5 |
| Vulcanization accelerator B | 0.5 | 0.3 | 0.5 | 0.6 | 0.5 | 0.5 |
| Vulcanization accelerator C | 0.5 | 0.5 | 0.5 | 0.5 | 0.5 | 0.8 |
| Vulcanization accelerator D | 0.75 | 0.75 | 0.75 | 0.75 | 0.75 | 0.6 |
| Carbon black | 75 | 75 | 75 | 75 | 75 | 75 |
| Zinc oxide | 5 | 5 | 5 | 5 | 5 | 5 |
| Magnesium oxide | 2 | 2 | 2 | 2 | 2 | 2 |
| Stearic acid | 2 | 2 | 2 | 2 | 2 | 2 |
| Antiozonant | 2 | 2 | 2 | 2 | 2 | 2 |
| Process oil | 25 | 25 | 25 | 25 | 25 | 25 |

TABLE 2

|  | Comparative examples | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| CR | 50 | 50 | 50 | 50 | 50 | 50 | 50 | 50 | 50 | 50 | 50 | 50 | 50 |
| SBR | 50 | 50 | 50 | 50 | 50 | 50 | 50 | 50 | 50 | 50 | 50 | 50 | 50 |
| Sulfur | 0.8 | 0.8 | 0.8 | 0.8 | 0.8 | 1.6 | 0.8 | 0.8 | 0.8 | 0.8 | 0.6 | 0.6 | 0.8 |
| Vulcanization accelerator A | 0.8 | 0.4 | 0.4 | 0.5 | 0.5 | 0.5 | 0.1 | 0.8 | 0.6 | 0.6 | 0.5 | 0.5 | 0.5 |
| Vulcanization accelerator B | 0.8 | 0.4 |  | 0.5 | 0.5 | 0.5 | 0.5 | 0.5 | 0.1 | 0.75 | 0.5 | 0.5 | 0.5 |
| Vulcanization accelerator C |  |  | 0.5 | 0.5 |  | 0.5 | 0.5 | 0.5 | 0.5 | 0.5 | 0.1 | 1 | 0.5 |
| Vulcanization accelerator D |  |  |  |  | 0.75 | 0.75 | 0.75 | 0.75 | 0.6 | 0.6 | 0.6 | 0.6 | 1.6 |
| Carbon black | 75 | 75 | 75 | 75 | 75 | 75 | 75 | 75 | 75 | 75 | 75 | 75 | 75 |
| Zinc oxide | 5 | 5 | 5 | 5 | 5 | 5 | 5 | 5 | 5 | 5 | 5 | 5 | 5 |
| Magnesium oxide | 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 | 2 |
| Antiozonant | 2 | 2 | 2 | 2 | 2 | 2 | 2 | 2 | 2 | 2 | 2 | 2 | 2 |
| Process oil | 25 | 25 | 25 | 25 | 25 | 25 | 25 | 25 | 25 | 25 | 25 | 25 | 25 |

Details of each of the components listed in Tables 1 and 2 are as described below.

CR: trade name: Denka Chloroprene S-41, manufactured by Denki Kagaku Kogyo K.K; non-sulfur-modified chloroprene rubber; Mooney viscosity (ML1+4, 125° C.): 47

SBR: trade name: Nipol 1502, manufactured by Zeon Corporation; emulsion polymerization SBR; bonding styrene content: 23.5 mass %; Mooney viscosity (ML1+4, 100° C.): 52

Sulfur: manufactured by Hosoi Chemical Industry Co., Ltd.

Vulcanization accelerator A: tetramethylthiuram monosulfide; trade name: Sanceler TS-G, manufactured by Sanshin Chemical Industry Co., Ltd.

Vulcanization accelerator B: N,N'-diphenylguanidine; trade name: Soxinol D-G, manufactured by Sumitomo Chemical Co., Ltd.

Vulcanization accelerator C: N-t-butyl-2-benzothiazolyl sulfenamide; trade name: NOCCELER NS-P, manufactured by Ouchi Shinko Chemical Industrial Co., Ltd.

Vulcanization accelerator D: 2-mercaptoimidazoline; trade name: Sanmix 22-80E, manufactured by Sanshin Chemical Industry Co., Ltd. (Note that, in the working examples and comparative examples, the vulcanization accelerator D was compounded based on the net content (100 mass %) of 2-mercaptoimidazoline contained in the commercially available Sanmix 22-80E and was not compounded based on the mass of the commercially available Sanmix 22-80E in which the purity of the 2-mercaptoimidazoline is 80 mass %)

Carbon black: FEF grade carbon black (trade name: HTC#100, manufactured by NSCC Carbon Co., Ltd.)

Zinc oxide: type III zinc oxide (manufactured by Seido Chemical Industry Ltd.)

Magnesium oxide: trade name: Kyowa Mag 150, manufactured by Kyowa Chemical Industry Co., Ltd.

Stearic acid: manufactured by NOF Corporation

Antiozonant: trade name: Ozonone 6C, manufactured by Seiko Chemical Co., Ltd.

Process oil: aroma oil; trade name: A-OMIX, manufactured by Sankyo Yuka Kogyo K. K.

<Adhesion Test>

An unvulcanized rubber sheet having a square shape (width 120 mm×length 120 mm×thickness 2 mm) was produced by kneading a rubber composition having a composition shown in Table 1 by a conventional method. The adhesion between the obtained unvulcanized rubber sheet and the brass-plated wire was evaluated under the following conditions.

(Adhesion Evaluation 1: Initial Adhesion and Wire Peeling Test)

On the surface of the produced unvulcanized rubber sheet, three sets of a set of five brass-plated wires (diameter: 0.6 mm; length: 100 mm) that were put side by side were arranged, and the both ends thereof were adhered and fixed by a tape. Then, the fixed unvulcanized rubber sheet was vulcanized at 142° C. for 90 minutes. Thereafter, the wires were peeled from the rubber sheet, and the surface conditions of the peeled wires were visually observed. The evaluation of adhesion was performed by calculating the proportion of the wires having the rubber attached to the surface thereof, relative to the total number of sets of the wires adhered to the unvulcanized rubber sheet. Evaluation criteria are shown below.

○: proportion of the wires having the rubber attached to the surface thereof was 80% or greater x: proportion of the wires having the rubber attached to the surface thereof was less than 80%

(Adhesion Evaluation 2: After Thermal Deterioration)

After the produced unvulcanized rubber sheet was placed in a constant temperature and high humidity chamber at 50° C. with a relative humidity of 95% RH for 168 hours, the unvulcanized rubber sheet was removed from the high humidity chamber. Within 2 hours from the removal, the wires were peeled from the rubber sheet, and the surface conditions of the peeled wires were visually observed. Evaluation criteria are shown below.

○: proportion of the wires having the rubber attached to the surface thereof was 60% or greater x: proportion of the wires having the rubber attached to the surface thereof was less than 60%

<Heat Resistance Evaluation>

Heat aging test (100° C.×336 hr) was performed in accordance with JIS K 6257:2010 as the heat resistance test. After heating the vulcanized rubber at a specified temperature for a specified time using a heat aging tester, elongation at break (EB) was measured in accordance with JIS K 6251:2010, and hardness (HS) was measured in accordance with JIS K 6253-3:2012. The heat resistance was evaluated by examining the aging properties of the vulcanized rubber by determining the rate of change in elongation at break (ΔEB) or the rate of change in hardness (ΔHS) relative to the values prior to the heat treatment. Evaluation criteria are shown below. Test results are shown in Tables 3 and 4 below.

○: ΔEB was from −40% to 0%, and ΔHS was from 0 to 20 x: a case where the evaluation was not "○"

TABLE 3

| | Working examples | | | | | |
|---|---|---|---|---|---|---|
| | 1 | 2 | 3 | 4 | 5 | 6 |
| Adhesion evaluation 1 | 90 | 90 | 100 | 90 | 90 | 90 |
| Adhesion evaluation 2 | 90 | 80 | 100 | 90 | 90 | 90 |
| Heat resistance evaluation | ○ | ○ | ○ | ○ | ○ | ○ |

TABLE 4

| | Comparative examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Adhesion evaluation 1 | 90 | 90 | 90 | 80 | 90 | 100 | 90 | 90 | 90 | 90 | 90 | 40 | 50 |
| Adhesion evaluation 2 | 50 | 90 | 50 | 50 | 90 | 100 | 90 | 50 | 90 | 40 | 90 | 40 | 50 |
| Heat resistance evaluation | ○ | x | x | ○ | x | x | x | ○ | x | ○ | x | ○ | ○ |

As shown in Tables 3 and 4, all of the rubber compositions according to Working Examples 1 to 6 containing a predetermined amount of sulfur, a predetermined amount of a thiuram vulcanization accelerator, a predetermined amount of a guanidine vulcanization accelerator, a predetermined amount of a sulfenamide vulcanization accelerator, and a predetermined amount of a thiourea vulcanization accelerator relative to the amount of the diene polymer exhibited excellent adhesion and heat resistance. On the other hand, for the cases where at least one type of a thiuram vulcanization accelerator, guanidine vulcanization accelerator, sulfenamide vulcanization accelerator, or thiourea vulcanization accelerator was not compounded, at least one of the evaluation result of adhesion or heat resistance was deteriorated (Comparative Examples 1 to 5). It is thought that this is because adhesion and heat resistance were not enhanced in a well-balanced manner due to not containing the four types of the vulcanization accelerators. Furthermore, also for the cases where the compounded amount of at least one type of sulfur, a thiuram vulcanization accelerator, guanidine vulcanization accelerator, sulfenamide vulcanization accelerator, or thiourea vulcanization accelerator was outside the range of the specified amount, at least one of the evaluation result of adhesion or heat resistance was deteriorated (Comparative Examples 6 to 13). It is thought that this is because adhesion and heat resistance were not enhanced in a well-balanced manner as a result of not achieving sufficient crosslinking characteristics due to losing the balance of the sulfur and the four types of the vulcanization accelerators.

The invention claimed is:

1. A rubber composition comprising:
   from 0.5 parts by mass to 1.5 parts by mass of sulfur,
   from 0.2 parts by mass to 0.6 parts by mass of a thiuram vulcanization accelerator,
   from 0.2 parts by mass to 0.6 parts by mass of a guanidine vulcanization accelerator,
   from 0.15 parts by mass to 0.8 parts by mass of a sulfenamide vulcanization accelerator, and
   from 0.1 parts by mass to 1.5 parts by mass of a thiourea vulcanization accelerator,
   per 100 parts by mass of a diene polymer containing a chloroprene rubber and a styrene butadiene rubber,
   wherein, in the diene polymer, a content of the chloroprene rubber is not less than 40 mass %, and a content of the styrene butadiene rubber is not greater 60 mass %.

2. A vulcanized rubber product comprising the rubber composition described in claim 1.

3. The rubber composition according to claim 1, wherein, the compounded amount of the diene polymer is from 20 mass % to 70 mass % relative to the total amount of the rubber composition.

* * * * *